US008335175B2

(12) United States Patent
Das et al.

(10) Patent No.: US 8,335,175 B2
(45) Date of Patent: Dec. 18, 2012

(54) SYSTEMS AND METHODS FOR PAGE DELIVERY TO A WIRELESS CLIENT DEVICE IN IDLE STATE

(75) Inventors: Soumya Das, San Diego, CA (US); Samir S. Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 310 days.

(21) Appl. No.: 12/755,919

(22) Filed: Apr. 7, 2010

(65) Prior Publication Data

US 2011/0249571 A1    Oct. 13, 2011

(51) Int. Cl.
*G08C 17/00* (2006.01)
*H04B 1/16* (2006.01)
*H04W 68/00* (2009.01)
*G06F 1/00* (2006.01)

(52) U.S. Cl. ............... 370/311; 455/343.2; 455/458; 713/323

(58) Field of Classification Search .................. None
See application file for complete search history.

(56) References Cited

U.S. PATENT DOCUMENTS

| 7,269,629 | B2 * | 9/2007 | Zmudzinski et al. ......... 709/207 |
| 7,349,355 | B2 | 3/2008 | Sengupta et al. |
| 2003/0198196 | A1 * | 10/2003 | Bahl et al. ..................... 370/311 |
| 2006/0075269 | A1 | 4/2006 | Liong et al. |
| 2006/0087993 | A1 * | 4/2006 | Sengupta et al. ............. 370/310 |
| 2007/0264955 | A1 * | 11/2007 | Tsai et al. ................... 455/186.1 |
| 2008/0014921 | A1 * | 1/2008 | Venkatachalam ............. 455/425 |
| 2008/0045178 | A1 * | 2/2008 | Venkatachalam .......... 455/404.2 |
| 2008/0192666 | A1 * | 8/2008 | Koskan et al. ................. 370/311 |
| 2009/0219844 | A1 | 9/2009 | Soliman |
| 2009/0221303 | A1 | 9/2009 | Soliman |

FOREIGN PATENT DOCUMENTS

GB    2396525 B    5/2006

OTHER PUBLICATIONS

Mahkoum, H, et al., A framework for power management of handheld devices with multiple radios, IEEE Wireless Communications and Networking Conference, WCNC, 2009, Apr. 5-9, 2009, 6 pages, Institute of Electrical and Electronics Engineers, Inc.
3rd Generation Partnership Project; Technical Specification Group Radio Access Network; Interlayer procedures in Connected Mode (Release 9), 3GPP Standard; 3GPP TS 25.303, 3rd Generation Partnership Project (3GPP), Mobile Competence Centre ; 650, Route Des Lucioles ; F-06921 Sophia-Antipolis Cedex ; France, No. V9.0.0, Dec. 21, 2009, pp. 1-76, XP050401497, [retrieved on Dec. 21, 2009] p. 67-68.
International Search Report and Written Opinion—PCT/US2011/031607—ISA/EPO—Aug. 4, 2011.

* cited by examiner

*Primary Examiner* — Clemence Han
(74) *Attorney, Agent, or Firm* — Jeffrey C. Jacobs (57) ABSTRACT

Proxy devices simultaneously support multiple modes of client device operation. Embodiments facilitate continued support of idle mode, proxy state operation of one or more client devices by a proxy device that is serving an active connected mode proxied client device. Paging message delivery from the proxy device to an idle mode proxied client device is facilitated by the proxy device monitoring a channel associated with the active connected mode proxied client device for a message (e.g., paging message) associated with the idle mode proxied client device.

22 Claims, 6 Drawing Sheets

SYSTEMS AND METHODS FOR PAGE DELIVERY TO A WIRELESS CLIENT DEVICE IN IDLE STATE

TECHNICAL FIELD

The disclosure relates generally to wireless communications and, more particularly, to providing page delivery to wireless client devices when the wireless client devices are in an idle state.

BACKGROUND

Various client devices, such as laptop computers, personal digital assistant (PDA) devices, cellular telephones, digital video recorder (DVR) devices, internet appliances, and other processor-based devices, that communicate with other devices through the use of wireless communication links are becoming nearly ubiquitous. Such wireless client devices are often mobile and thus battery powered, and thus the amount of power available for use by the wireless client device is limited. Even where the client device is not mobile or battery powered the amount of power available to or used by a wireless client device may be limited or otherwise sought to be minimized.

In order to reduce the amount of power consumed by a client device, the client device may be provided with several modes of operation. For example, it is becoming common for client devices to be configured to operate in an "active" mode and an "idle" mode. In an active mode a client device may be receiving and transmitting information, such as operating to actively exchange data with one or more access points or other nodes in a wireless communication system and/or performing other functionality, thereby consuming a higher level of power. In an idle mode a client device may be receiving information only (e.g., substantially non-functional), such as operating only to monitor control channels (e.g., paging channels) and/or user interfaces for a mode change trigger (e.g., "wake up" message), thereby consuming a reduced level of power.

Although consuming appreciably less power when operating in an idle mode than when operating in an active mode, client devices may nevertheless consume an appreciable amount of power when in idle mode. For example, the client device may periodically turn its receiver on to listen for paging messages (e.g., messages that alert the client device to the occurrence of an incoming call and control/overhead messages that carry system information and other information for the client device) over its paging channel. Such cycling of the receiver often results in significant power consumption. For example, for a client device that is compliant with code division multiple access (CDMA) and/or global system for mobile communications (GSM) standards, current consumption in an idle mode may be as high as a few milli-amperes (mA) as a result of cycling the receiver for paging messages.

Recently, proxy devices have been developed to facilitate additional power consumption reductions in association with idle mode operation client devices. Such a proxy device may operate to monitor pages and broadcast information on behalf of one or more client device (e.g., a limited number of client devices depending upon the out of band link capabilities, such as 1-10 client devices; for example 7 client devices for a BLUETOOTH out of band link of embodiments) operating in an idle mode, proxy state with the proxy device. An idle mode proxied client device (i.e., a client device operating in an idle mode, proxy state with the proxy device) may communicate with the proxy device using short range wireless links (e.g., BLUETOOTH, ultra-wideband (UWB), etc.) or other wireless links providing for low power operation (e.g., due to proximity to the proxy device, using more power efficient links, etc.). Although the idle mode proxied client device may cycle a receiver to monitor for a paging message from the proxy device, the particular circuitry used and/or the power consumed by the circuitry used may result in reduced power consumption as compared to idle mode operation without the use of a proxy device. Accordingly, the foregoing idle mode, proxy state operation facilitates power consumption savings which is particularly beneficial with respect to power sensitive mobile client devices.

In addition to the aforementioned idle mode operation, such proxy devices may additionally provide active mode operation with respect to client devices. For example, a client device may connect to a communication network via a proxy device. A proxy device may thus provide proxy operation supporting a client device in an active mode, proxy connected state, such as in response to a paging message received by the client device through the proxy device, for completion of a call by the client device in active mode operation. The use of the proxy device for such active mode, proxy connected state operation may be desirable to provide for reduced power consumption in active mode operation, such as by using short range wireless links or other wireless links providing for low power operation.

However, when one active mode client device enters a connected state (e.g., makes or receives a call), the proxy device cannot simultaneously monitor the paging information for other idle mode proxied client devices while in the connected state for the one active connected mode proxied client device (i.e., a client device operating in an active mode, proxy connected state with the proxy device). Thus, the proxy device either must support the active connected mode proxied client device and discontinue idle mode, proxy state operation with respect to all other client devices (e.g., the other client devices are forced to monitor the pages and broadcast information on their own) or must support the idle mode proxied client devices and forego active mode, proxy connected state operation with respect to the active connected mode client device (e.g., the active connected mode client device is forced to seek a connected state on its own within the communication network).

In both of the foregoing active mode scenarios one or more client devices is unable to enjoy the services of the proxy device. This reduces the potential for power savings with respect to the client devices. Moreover, if the proxy device releases either the active connected mode proxied client device or the idle mode proxied client devices the released device or devices will need to re-connect to the proxy device (e.g., once the call is over) to again enjoy the services of the proxy device. This results in additional signaling messages in the network as well as over the short range wireless link.

BRIEF SUMMARY

The disclosure is directed to systems and methods which provide for proxy device operation simultaneously supporting multiple modes of client device operation. Embodiments described herein facilitate continued support of idle mode, proxy state operation of one or more client devices by a proxy device that is serving an active connected mode proxied client device. In operation according to an embodiment, paging message delivery from the proxy device to an idle mode proxied client device is facilitated by the proxy device monitoring a channel associated with the active connected mode proxied client device for a message (e.g., paging message) associated with the idle mode proxied client device.

When a message is detected in a channel associated with the active connected mode proxied client device for an idle mode proxied client device, the proxy device may utilize its short range wireless link or other wireless link with the idle mode proxied client device to deliver the message. If, for example, the message delivered to the idle mode proxied client device initiates active mode operation (e.g., a paging message to establish a call), the idle mode proxied client device may receive the page via the proxy device over the short range wireless link, enter active mode, deregister with the proxy device, and initiate a network connection independent of the proxy device. This client device may later reregister with the proxy device for idle mode, proxy state operation and active mode, connected operation (e.g., where another client device is not already being served by the proxy device in an active mode, proxy connected state), such as upon completion of the call, upon entering an idle state, upon a client device being served by the proxy device in an active mode, proxy connected state releasing the connection, etc. The active connected mode proxied client device and other idle mode proxied client devices may continue to be served by the proxy device throughout the foregoing.

Where the proxy device can support more than one client device in active mode, proxy connected state operation, the aforementioned client device need not deregister from the proxy device. Accordingly, a client device of embodiments may be operating in an active mode, proxy connected state along with another active connected mode proxied client device according to embodiments of the invention.

The foregoing has outlined rather broadly the features and technical advantages of embodiments of the present disclosure in order that the detailed description that follows may be better understood. Additional features and advantages will be described hereinafter. It should be appreciated by those skilled in the art that the conception and specific embodiments disclosed may be readily utilized as a basis for modifying or designing other structures for carrying out the same purposes of the present disclosure. It should also be realized by those skilled in the art that such equivalent constructions do not depart from the spirit and scope of the appended claims. The novel features which are believed to be characteristic of the concepts disclosed herein, both as to their organization and method of operation, together with further objects and advantages will be better understood from the following description when considered in connection with the accompanying figures. It is to be expressly understood, however, that each of the figures is provided for the purpose of illustration and description only and is not intended as a definition of the limits of the claims.

BRIEF DESCRIPTION OF THE DRAWING

For a more complete understanding of the present teachings, reference is now made to the following description taken in conjunction with the accompanying drawing.

DETAILED DESCRIPTION

Figure 1A:
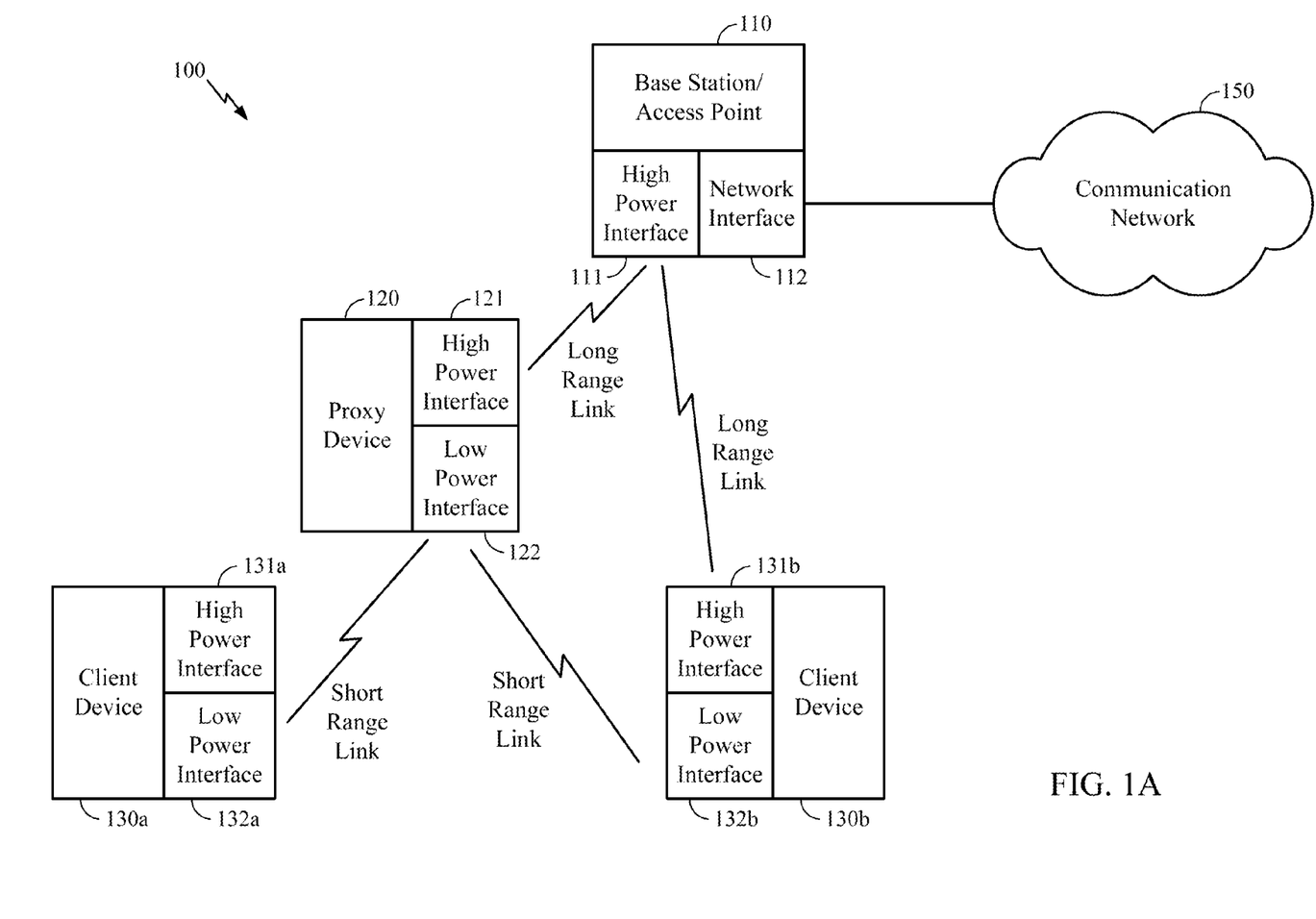
FIG. 1A shows a block diagram of a wireless communication system adapted according to embodiments disclosed herein.

A block diagram illustrating wireless communication system 100 in which one or more proxy devices may act as proxies to facilitate power conservation with respect to one or more client devices is shown in FIG. 1A. As shown in FIG. 1A, base station/access point 110 may provide a wireless interface for communication network 150, such as may comprise a cellular telephone network, a cellular data network, a local area network (LAN), a metropolitan area network (MAN), a wide area network (WAN), the public switched telephone network (PSTN), the internet, etc. Various devices (e.g., client devices 130a, 130b and proxy device 120) are adapted for communicating over wireless communication network 150, such as via one or more access points (e.g., base station/access point 110).

Base station/access point 110 of the illustrated embodiment may comprise various configurations of base station or wireless access point equipment. As used herein, a base station/access point may be a device that communicates with various terminals (e.g., client devices, proxy devices, etc.) and may also be referred to as, and include some or all the functionality of, a base station, a Node B, and/or other similar devices. Embodiments of base station/access point 110 provide a relatively long range, high power communication interface to facilitate communication within a service area associated with base station/access point 110. Such a long range, high power communication interface may operate according to various communication standards, including but not limited to wideband code division multiple access (W-CDMA), CDMA2000, global system for mobile telecommunication (GSM), and worldwide interoperability for microwave access (WiMax).

Figure 1B:
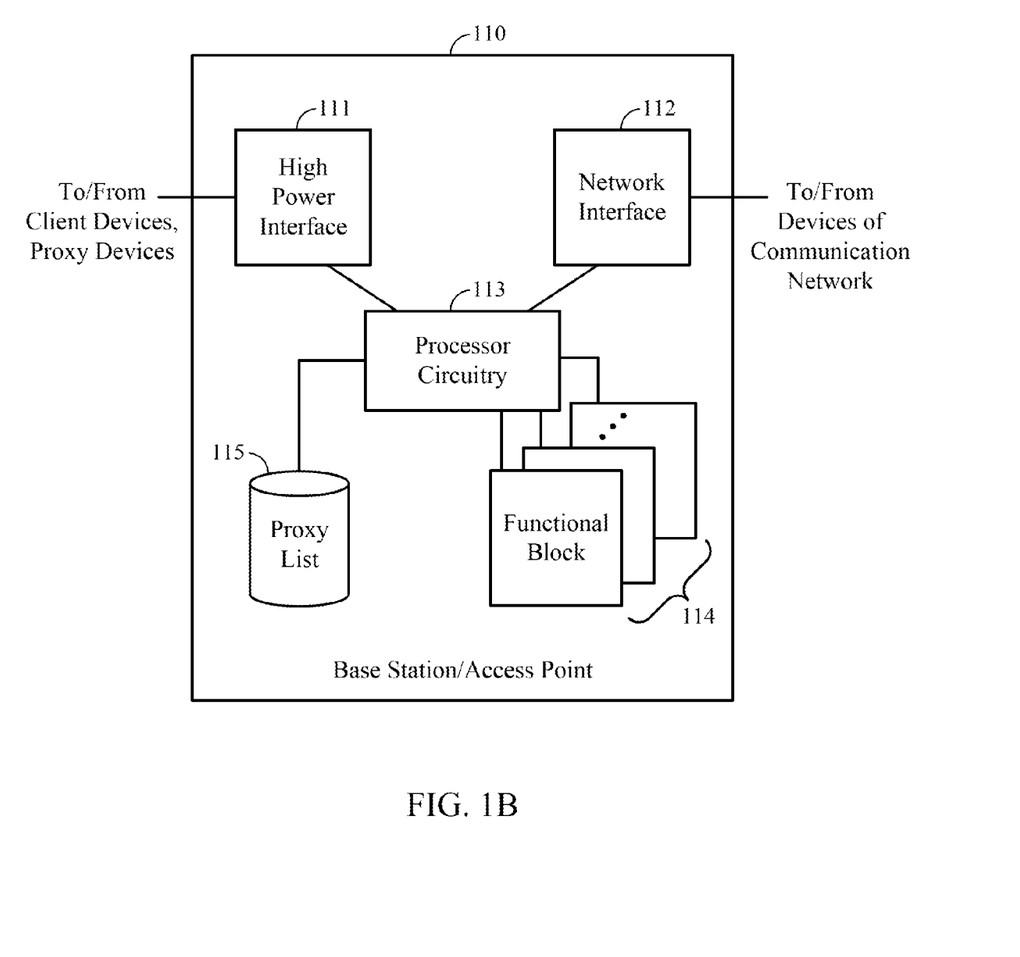
FIG. 1B shows detail with respect to a base station/access point of the wireless communication system of FIG. 1A according to embodiments disclosed herein.

Referring now to FIG. 1B, additional detail with respect to an embodiment of base station/access point 110 is shown. Base station/access point 110 may comprise various configurations of devices, such as a processor-based system configured as a cellular base station, femto cell, pico cell, wireless LAN (WLAN) access point, etc. providing wireless links with respect to communication network 150. Accordingly, base station/access point 110 of the illustrated embodiment comprises high power interface 111 (e.g., transceiver that consume relatively large amounts of power in operation) for communicating directly with various devices, such as proxy device 120 and client devices 130a and 130b, through a wireless link. Furthermore, base station/access point 110 of the illustrated embodiment also includes network interface 112 (e.g., packet switched network interface, switched network interface, radio network interface, control network interface, and/or the like) for communicating with various devices of communication network 150.

Base station/access point 110 of the embodiment illustrated in FIG. 1B further comprises one or more functional blocks 114, including circuitry and/or instruction sets, operable to provide desired functionality with respect to base station/access point 110 (e.g., call processing, database management, message routing, etc.). High power interface 111, network interface 112, and functional blocks 114 operate under control of processor circuitry 113, such as a general purpose processor operable under control of an instruction set (e.g., software, firmware, etc.) or special purpose processor (e.g., ASIC, PGA, etc.), providing operation as described herein. Processor circuitry 113 can include circuitry in addition to the aforementioned processor, such as memory (e.g., random access memory (RAM), read only memory (ROM), flash memory, magnetic memory, optical memory, etc.), input/output circuits (e.g., display, keyboard, pointer, audio, etc.), and/or the like. Base station/access point 110 also includes proxy list 115 to facilitate operation of proxy functionality as described herein.

Although illustrated as part of base station/access point 110 in FIG. 1B, it should be appreciated that various functional blocks thereof may be provided by other devices of communication network 150. For example, the information of the proxy list may be centrally stored or otherwise stored elsewhere within the network.

Figure 1C:
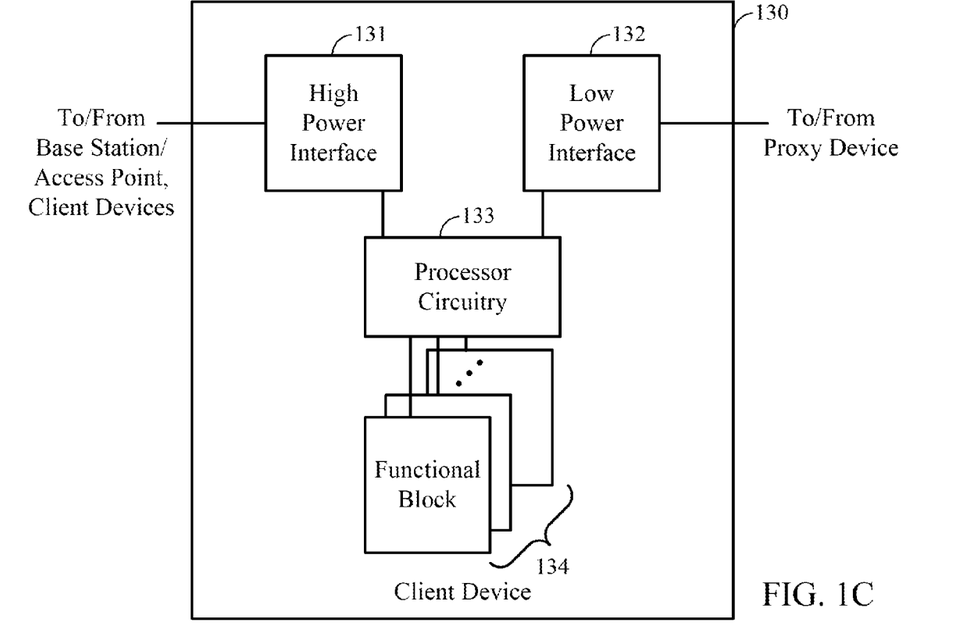
FIG. 1C shows detail with respect to a client device of the wireless communication system of FIG. 1A according to embodiments disclosed herein.
Figure 1D:
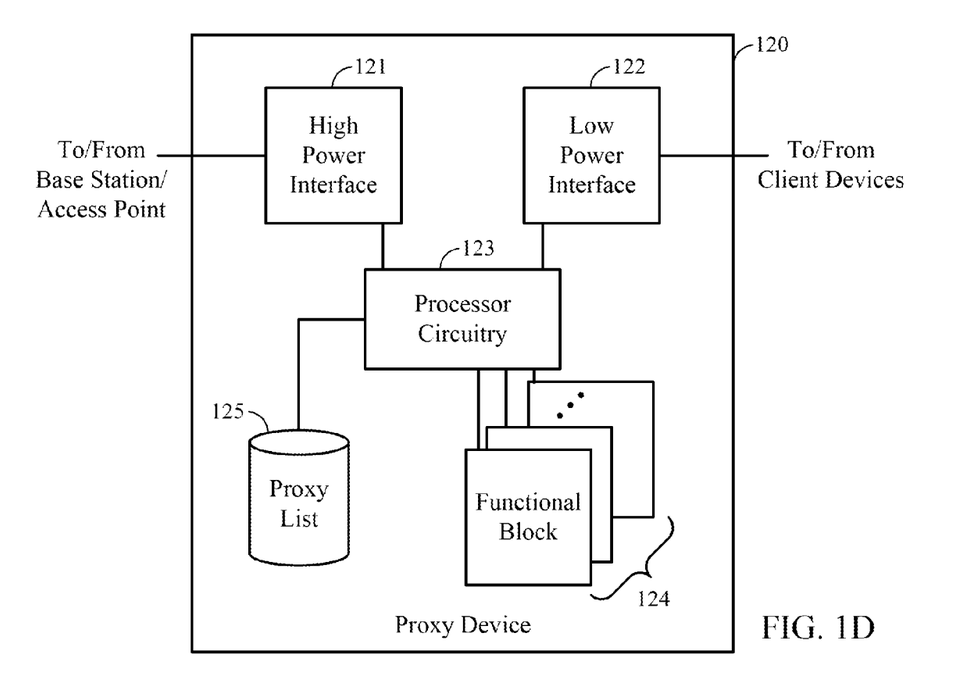
FIG. 1D shows detail with respect to a proxy device of the wireless communication system of FIG. 1A according to embodiments disclosed herein.

Proxy device 120 and client devices 130 of the illustrated embodiment include high power interfaces 121 and 131, respectively, for communicating directly with base station/access points, such as base station/access point 110, through a wireless link. Furthermore, proxy device 120 and client devices 130 of the illustrated embodiment also include low power interfaces (e.g., transceivers that consume relatively low amounts of power in operation) 122 and 132, respectively, for communicating directly with each other. It should be clear that the terms "high power" and "low power" are relative terms and do not imply a particular level of power consumption. Accordingly, low power interfaces 122 and 132 simply consume less power than the high power interfaces 121 and 131 for a given time of operation. In one implementation, the low power interfaces provide relatively low bandwidth communication, relatively short range communication, and/or consume relatively little power whereas the high power interfaces provide relatively high bandwidth communication, long range communication, and/or consume appreciable power.

High power interfaces 121 and 131 may operate according one or more communication standards, including but not limited to W-CDMA, CDMA2000, GSM, WiMax, and WLAN. For example, a long range, high power, and/or high bandwidth communication interface, such as high power interfaces 121 and 131, is a W-CDMA compliant transceiver. In W-CDMA, a client device may use discontinuous reception (DRX) in idle mode of its high power interface in order to reduce power consumption. When DRX is used, the client device monitors a page indicator (PI) in a paging occasion per DRX cycle. The paging indicator channel (PICH) may be a fixed rate (SF=256) physical channel used to carry the paging indicators. The PICH is associated with a secondary common control physical channel (S-CCPCH) to which a PCH transport channel is mapped.

One example of a short range, low power, and/or low bandwidth communication interface, such as low power interfaces 122 and 132, is a BLUETOOTH compliant transceiver that uses a time-division duplex (TDD) scheme. Such a BLUETOOTH interface may alternately transmit and receive in a synchronous manner. This allows multiple terminals connected via BLUETOOTH technology to communicate in a dynamic fashion often called piconet. The communication may be synchronized by a system clock of a master terminal (i.e., a terminal that initiates communications with a slave terminal). The BLUETOOTH device address (BD_ADDR) of the master terminal determines the frequency hopping sequence and the channel access code; the system clock of the master terminal determines the phase in the hopping sequence. The master terminal controls the traffic on the channel by a polling scheme.

Directing attention to FIG. 1C, additional detail with respect to an embodiment of client devices 130*a*, 130*b* is shown. Client device 130 may comprise various configurations of devices, such as personal computers (e.g., laptop computers, netbook computers, tablet computers, etc.), cellular telephones, PDAs, DVRs, internet appliances, gaming consoles, e-readers, etc. In addition to high power interface 131 and low power interface 132, client device 130 of the embodiment illustrated in FIG. 1C comprises one or more functional blocks 134, including circuitry and/or instruction sets, operable to provide desired functionality with respect to the client device (e.g., call processing, database management, multimedia playback, text messaging, multimode operation, etc.). High power interface 131, low power interface 132, and functional blocks 134 operate under control of processor circuitry 133, such as a general purpose processor operable under control of an instruction set (e.g., software, firmware, etc.) or special purpose processor (e.g., application specific integrated circuit (ASIC), programmable gate array (PGA), etc.), providing operation as described herein. Processor circuitry 133 can include circuitry in addition to the aforementioned processor, such as memory (e.g., random access memory (RAM), read only memory (ROM), flash memory, magnetic memory, optical memory, etc.), input/output circuits (e.g., display, keyboard, pointer, audio, etc.), and/or the like. Client device 130 is powered by an internal (limited) power source (e.g., battery).

Referring now to FIG. 1D, additional detail with respect to an embodiment of proxy device 120 is shown. Proxy device 120 may comprise various configurations of devices, such as gateway, router, switch, repeater, hub, concentrator, etc. In addition to high power interface 121 and low power interface 122, proxy device 120 of the embodiment illustrated in FIG. 1D has one or more functional blocks 124, such as circuitry and/or instruction sets, operable to provide desired functionality with respect to the proxy device (e.g., call processing, database management, proxy services, packet routing, gateway functionality, position location determination functionality (e.g., global positioning system (GPS) functionality), etc.). High power interface 121, low power interface 122, and functional blocks 124 operate under control of processor circuitry 123, such as a general purpose processor operable under control of an instruction set (e.g., software, firmware, etc.) or special purpose processor (e.g., ASIC, PGA, etc.), providing operation as described herein. Processor circuitry 123 can include circuitry in addition to the aforementioned processor, such as memory (e.g., random access memory (RAM), read only memory (ROM), flash memory, magnetic memory, optical memory, etc.), input/output circuits (e.g., display, keyboard, pointer, audio, etc.), and/or the like. Proxy device 120 of embodiments includes proxy list 125 to facilitate operation of proxy functionality as described herein.

Although illustrated as an independent or "stand alone" device, proxy device 120 or functionality thereof may be integrated into one or more host devices. For example, the operations and/or functionality of a proxy device may be integrated into a base station/access point or other node of communication network 150. Alternatively, the operations and/or functionality of a proxy device may be integrated into a client device. For example, a client device operating in an active mode, connected state with communication network 150 may offer proxy services to other client devices according to embodiments.

Client devices 130 of embodiments operate in various modes, including an active mode and an idle mode. While in active mode, client devices 130 may use high power interface 131 to communicate with one or more base station/access points (e.g., base station/access point 110) to establish a call or other communication session with respect to communication network 150. In idle mode, client devices 130 may periodically turn on high power interface 131 to monitor for paging or other messages (e.g., system information) sent by a base station/access point (e.g., base station/access point 110). Such idle mode operation provides for decreased power consumption by a client device. Nevertheless, when a client device operates in idle mode it continues to consume appreciable power as the high power interface is cycled on and off to check for paging or other messages.

Accordingly, client devices 130 are configured for improved power conservation using proxy state operation, such as via proxy device 120. In a power conservation mode of operation, a client device 130 seeking to enter idle mode may request that a proxy device (e.g., proxy device 120) act as its proxy for monitoring paging or other messages for the client device. The proxy device 120 communicates appropriate messages to a client device operating in an idle mode, proxy state using the low power interface, thereby allowing the client device 130 to temporarily deactivate its high power interface.

The client device 130 may identify one or more local proxy devices 120 available for proxy state operation by scanning on high power interface 131, scanning on low power interface 132, analyzing coordinate information (e.g., GPS location information) and proxy device location information (e.g., proxy device location database), etc. For example, low power interface 131 may be used to scan for proxy devices 120 since it is the interface that will be used to receive messages when the client device 130 is operating in idle mode, proxy state. In performing such a scan, the client device 130 may attempt to identify potential proxy devices 120 that have both a high power interface and a low power interface so that the proxy device 120 is able to receive messages via its high power interface (e.g., intended for long range communications) and forward them to the intended client device 130 via the low power interface (e.g., intended for short range communications).

Once a suitable proxy device 120 has been identified and selected, a communication link via the low power interfaces of both the client device 130 and proxy device 120 may be established. For example, if the low power interfaces 122 and 132 comprise a BLUETOOTH compliant interface, proxy device 120 may be configured to operate according to a pseudo-random frequency hop sequence so that proxy device 120 and client device 130 can communicate with each other via their respective low power interfaces (e.g., the proxy device may operate as a BLUETOOTH master and the proxied client devices may operate as BLUETOOTH slaves, whereby the proxy device serves a plurality of client devices). Once the selected proxy device 120 has been established as a proxy for client device 130, high power interface 131 of the client device 130 may be temporarily deactivated (e.g., turned off or powered down) to facilitate power conservation. Because low power interface 132 consumes less power than high power interface 131 (it being appreciated that low power interface 132 may be cycled while operating in an idle mode, proxy state to periodically monitor for messages as described above), client device 130 conserves power and the life of the power source of client device 130 may be extended.

Figure 2A:
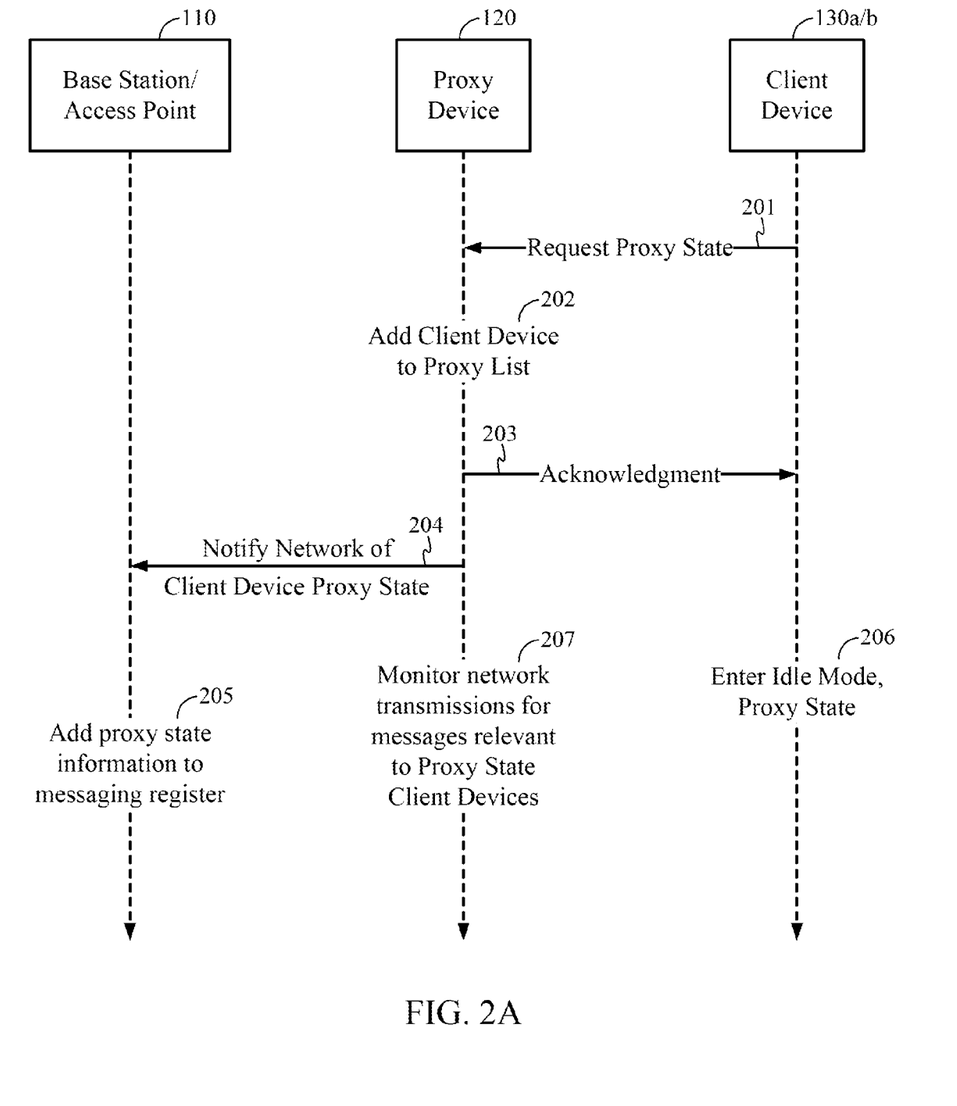
FIG. 2A shows a flow diagram of an exemplary operational flow for entering an idle mode, proxy state by a client device according to embodiments disclosed herein.

Directing attention to FIG. 2A, a flow diagram showing an exemplary operational flow for entering an idle mode, proxy state by a client device is shown. Note that the operational flow of FIG. 2A is applicable to any client device seeking to enter an idle mode, proxy state, and thus the client device is designated as client device 130a/b to denote operation with respect to either client device of FIG. 1A is represented. It should be appreciated that a number of client devices in addition to the two client devices represented by client devices 130a and 130b may be supported in accordance with the flow diagram of FIG. 2A. Upon entering the flow of FIG. 2A, client device 130a/b has identified proxy device 120 as a suitable proxy for idle mode, proxy state operation, using the proxy device identification techniques discussed above.

In operation according to the illustrated embodiment, client device 130a/b requests proxy state operation of proxy device 120 at point 201. Assuming proxy device 120 is able to accommodate proxy state operation with respect to client device 130a/b (e.g., proxy device 120 has not reached a proxy capacity, components of proxy device 120 are sufficiently operational to support proxy state operation, client device 130a/b is authorized for proxy state operation with proxy device 120, client device 130a/b is not excluded for proxy state operation with proxy device 120, and/or the like), proxy device 120 adds client device 130a/b to a proxy list reflecting the devices for which proxy state operation is being provided by proxy device 120 at point 202. For example, information identifying the client device requesting proxy state operation, such as international mobile subscriber identity (IMSI), temporary mobile subscriber identity (TMSI), electronic serial number (ESN), mobile identification number (MIN), internet protocol (IP) address, telephone number, and/or the like, may be stored in proxy list 125 (FIG. 1D) by proxy device 120 at point 202.

Having accepted proxy state operation for requesting client device 130a/b, proxy device 120 provides an acknowledgement of proxy state operation to client device 130a/b at point 203 and notifies systems of communication network 150 of the proxy state operation at point 204, such as through a base station/access point thereof (e.g., base station/access point 110). For example, proxy device 120 may provide information identifying the client device for which proxy state operation is being provided, e.g., client device IMSI, TMSI, ESN, MIN, IP address, telephone number, and/or the like, and information identifying the proxy device itself, e.g., proxy device IMSI, TMSI, ESN, MIN, IP address, and/or the like. One or more devices of communication network 150 (e.g., base station/access point 110) add the proxy state information to a messaging register (e.g., home location register (HLR), visitor location register (VLR), proxy state database, and/or the like) for use in paging and/or other messaging with respect to the proxy state client device at point 205.

Having received an acknowledgement of acceptance of proxy state operation by proxy device 120, client device 130a/b enters idle mode, proxy state operation at point 206. For example, client device 130a/b may temporarily deactivate (e.g., turn off or power down) high power interface 131 of the client device to facilitate power conservation while low power interface 132 is periodically cycled (e.g., turned on or powered up) to periodically monitor for messages from proxy device 120. Correspondingly, proxy device 120 provides proxy mode operation on behalf of client device 130a/b, including monitoring network transmissions for messages relevant to idle mode proxied client devices, including client device 130a/b, for which proxy state operation is provided by proxy device 120 at point 207. As will be better understood by the discussion of FIGS. 2B and 2C below, monitoring of network transmissions for messages relevant to client devices for which proxy state operation is provided may include monitoring paging or other channels associated with an idle mode, proxy state device for messages directed to that idle mode, proxy state device and/or monitoring control or other channels associated with an active mode, proxy connected state device for messages directed to an idle mode, proxy state device.

Although not shown in FIG. 2A, proxy device 120 may from time to time provide update information to systems of communication network 150 regarding proxy state operation, such as through a base station/access point thereof (e.g., base station/access point 110). For example, proxy device 120 may provide update information regarding the current state of particular devices (e.g., active connected mode, idle mode, proxied, deregistered, etc.), provide updated proxy list information identifying the client device for which proxy state operation is being provided, and/or the like.

Figure 2B:
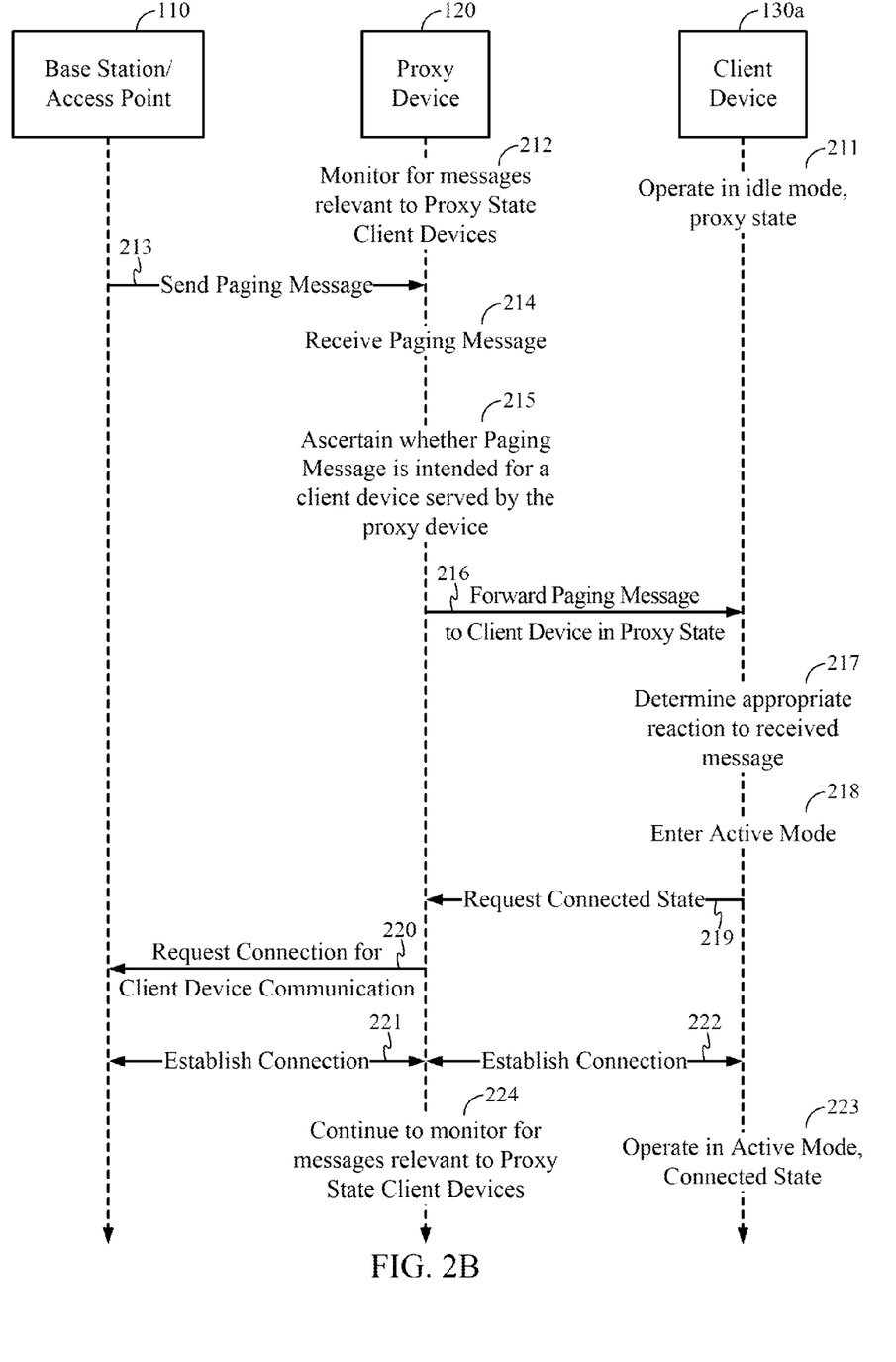
FIG. 2B shows a flow diagram of an exemplary operational flow for monitoring for paging or other messages and entering an active mode, proxy connected state by a client device according to embodiments disclosed herein.

Directing attention to FIG. 2B, a flow diagram showing an exemplary operational flow for monitoring for paging or other messages and entering an active mode, proxy connected state by a client device, when no other client device for which proxy state operation is being provided by the proxy device, is shown. Upon entering the flow of FIG. 2B, client devices 130*a* and 130*b* are both assumed to be in idle mode, proxy state operation supported by proxy device 120. Note that the operational flow of FIG. 2B is for the case where a first client device (here client device 130*a*) is entering a connected state, and proxy state operation continues to be provided for one or more other client devices (e.g., client device 130*b*, not shown in FIG. 2B). Thus, the client device for which active mode, proxy connected state operation is provided is designated as client device 130*a* and thus client device 130*b* remains in idle mode, proxy state operation in this example. The designation of client device 130*a* for transition to the active connected mode proxied state is arbitrary and is merely made for the present example. It should be appreciated that active mode, proxy connected state operation for client devices in addition to or in the alternative to client device 130*a* may be supported in accordance with the flow diagram of FIG. 2B.

In operation according to the illustrated embodiment, client device 130*a* operates in idle mode, proxy state at point 211. In this state, client device 130*a* may have temporarily deactivated (e.g., turned off or powered down) high power interface 131*a* of the client device to facilitate power conservation while low power interface 132*a* is periodically cycled (e.g., turned on or powered up) to periodically monitor for messages from proxy device 120.

In providing proxy state operation for client devices 130*a/b*, proxy device 120 monitors for messages relevant to the client devices 130*a/b* for which proxy state operation is provided at point 212. Paging procedure is used to transmit paging information to client devices 130*a/b* in idle mode (e.g., idle mode operation of embodiments may comprise radio resource control (RRC) idle state and RRC connected states CELL_PCH or URA_PCH). For example, a W-CDMA universal mobile telecommunications system (UMTS) terrestrial radio access network (UTRAN) may initiate paging for client devices 130*a/b* in the cell paging channel (CELL_PCH) state or UTRAN registration area (URA_PCH) state using the paging control channel (PCCH) (referred to as paging type 1 messages). In addition, UTRAN may initiate paging for client devices 130*a/b* in idle mode, CELL_PCH and URA_PCH state to trigger reading of updated system information. Accordingly, proxy device 120 may monitor the paging channels of client devices 130*a* and 130*b* using high power interface 121.

It should be appreciated that monitoring for paging or other messages by proxy device 120 may include monitoring channels in addition to or in the alternative to paging channels (e.g., PCCHs) of the idle mode, proxy state devices. There is a technique for delivering paging messages in W-CDMA for client devices 130*a/b* operating in a connected state for receiving another page, such as if a client device 130*a/b* is in a data call and is not monitoring the paging channels and there is voice/data call for that client device 130*a/b*. For example, UTRAN may initiate a procedure for a client device 130*a/b* in the cell dedicated channel (CELL_DCH) state or the cell forward access channel (CELL_FACH) state by transmitting a paging message on the dedicated control channel (DCCH) mapped to DCH or FACH (referred to as paging type 2 messages). Proxy device 120 may monitor such channels for messages relevant to client devices 130*a/b* for which proxy state operation is provided.

A device of communication network 150 may determine that a paging or other message is to be communicated to client device 130*a*. For example, it may be determined that a call is being placed to client device 130*a*. Thus, devices of communication network 150 may operate to determine an appropriate device (e.g., one or more particular base station/access point) and/or channel (e.g., one or more PCCH, DCCH, etc.) for transmitting the paging or other message, such as by determining a base station/access point (e.g., base station/access point 110) serving client device 130*a* and/or its designated proxy device (herein proxy device 120), determining a state of the client device 130*a* and/or its designated proxy device 120, etc.

In operation according to the illustrated embodiment, an appropriate paging or other message for client device 130*a* is communicated from base station/access point 110 to proxy device 120 providing proxy state operation for client device 130*a* at point 213. Continuing with the foregoing example, when no client device for which proxy state operation is provided by proxy device 120 is operating in a connected state, the foregoing paging or other message may be communicated via an appropriate paging channel monitored by proxy device 120. Irrespective of the particular technique utilized for delivery of the paging or other message, proxy device 120 receives the paging or other message (e.g., using high power interface 121) at point 214.

According to the illustrated embodiment, proxy device 120 operates to ascertain whether the received paging or other message is intended for a client device 130*a/b* served by the proxy device at point 215. For example, a paging channel may broadcast paging or other messages for a number of client devices, including client devices which are unknown to proxy device 120. Accordingly, proxy device 120 may analyze received messages to determine the relevance of such messages to the client devices 130*a/b* for which proxy state operation is being provided. Such analysis may include comparing client device information (e.g., IMSI, TMSI, ESN, MIN, IP address, telephone number, and/or the like) to information stored in proxy list 125.

Assuming proxy device 120 concludes that the paging or other message is intended for client device 130*a*, proxy device 120 forwards the paging or other message (or portion thereof) to client device 130*a* at point 216. For example, client device 130*a* may operate to periodically cycle (e.g., turn on or power up) low power interface 132*a* to periodically monitor for messages from proxy device 120 and, during such a cycle, proxy device 120 may communicate the paging or other message (or portion thereof) to client device 130a, such as via low power interface 122 and low power interface 132a.

Having received a paging or other message, client device 130a of the illustrated embodiment operates to determine the appropriate reaction to the received message at point 217. The message may, for example, provide information to client device 130a or otherwise not require or facilitate a change of operating mode or state of client device 130a, thereby resulting in client device 130a remaining in the idle mode, proxy state after receiving the message. However, the message may result in a change of operating mode or state of client device 130a, such as to establish an active call or other connection with communication network 150.

Assuming that an appropriate reaction to the message provided to client device 130a is to enter an active mode, connected state, client device 130a of the illustrated embodiment enters active mode at point 218. For example, a processor of client device 130a may become more or fully active, one or more interface (e.g., low power interface 132a) may be turned on (e.g., the cycling of the idle mode, proxy state operation discontinued), etc.

Consistent with the determination that the client device is to enter a connected state, client device 130a of the illustrated embodiment communicates a request to establish a connected state to proxy device 120 at point 219. The request may include information regarding the particular connection desired, the termination point of the connection, the resources to be made available for the connection, etc. For example, a paging message may include sufficient information to an intended recipient to reply to such message (e.g., accept the call), such as a broadcast control channel number (BCCH), a BCCH time offset, a sector number, etc. Accordingly, client device 130a and/or proxy device 120 may utilize information included in the paging or other message for establishing an appropriate connection in response to the message. For example, client device 130a may utilize information provided in the paging or other message for forming a connection request. Additionally or alternatively, client device 130a may utilize other information available to the client device for forming the connection request.

It should be appreciated that in the illustrated embodiment, proxy device 120 is adapted to provide connected state operation with respect to a client device 130a, thereby supporting active mode, proxy connected state operation. Active mode, proxy connected state operation according to embodiments continues to utilize the low power link between proxy device 120 and client device 130a (i.e., low power interfaces 122 and 132a), thereby providing low power connected state operation. That is, power consumption may be reduced when operating in an active mode, proxy connected state utilizing low power interfaces as compared with operating in an active mode, connected state utilizing high power interfaces (e.g., high power interface 131a to base station/access point 110 or high power interfaces 121 and 131a). Even where active mode, proxy connected state operation utilizes a high power link between proxy device 120 and client device 130a (i.e., high power interfaces 121 and 131a), power consumption may be reduced as compared with operating in an active mode, connected state directly with base station/access point 110 (i.e., high power interface 131a to base station/access point 110), such as due to the proximity of the client device to the proxy device.

In order to provide the desired active mode, proxy connected state operation, proxy device 120 of the illustrated embodiment requests that an appropriate connection with communication network 150 be established for serving client device 130a at point 220. In response, an appropriate network connection (e.g., using high power interface 121 to base station/access point 110) is established at point 221. Correspondingly, an appropriate client device connection (e.g., using low power interface 122 and 132a) is established at point 222. Using the foregoing connections, client device 130a is provided communications with communication network 150 via proxy device 120, and thus may operate in an active mode, proxy connected state in accordance with the received paging or other message at point 223.

Proxy device 120 of the illustrated embodiment is adapted to continue to provide proxy state operation with respect to idle mode client devices while providing the aforementioned proxy connected state operation for client device 130a. Specifically, although high power interface 121 of proxy device 120 may be utilized in providing proxy connected state operation for client device 130a, proxy device 120 of the illustrated embodiment is adapted to continue to monitor one or more channels for paging or other messages intended for an idle mode proxied client device (e.g., client device 130b) served by proxy device 120. Thus, proxy device 120 of the illustrated embodiment continues to monitor for messages relevant to idle mode proxied client devices at point 224.

In supporting both proxy connected state and proxy state operation for client devices according to embodiments, paging or other messages for idle mode, proxy state devices are delivered to the proxy device in a control channel (e.g., the DCCH) established for the active connected mode proxied client device. That is, to provide message delivery to an idle mode proxied client device by a proxy device which is serving an active connected mode proxied client device, embodiments operate to establish a first communication link between the proxy device and a network device (e.g., a base station/access point) for a communication session of the connected state client device, wherein the communication link includes a control channel, and monitoring the control channel by the proxy device for messages (e.g., paging or other messages) directed to an idle mode, proxy state device. Messages received for the idle mode proxied client device may be delivered to the idle mode, proxy state device by the proxy device via a second communication link (e.g., using low power interfaces 122 and 132). It should be appreciated that the foregoing facilitates supporting one client device in a connected state while allowing the proxy device to continue to receive pages and broadcast information for other client devices which are in idle mode.

Figure 2C:
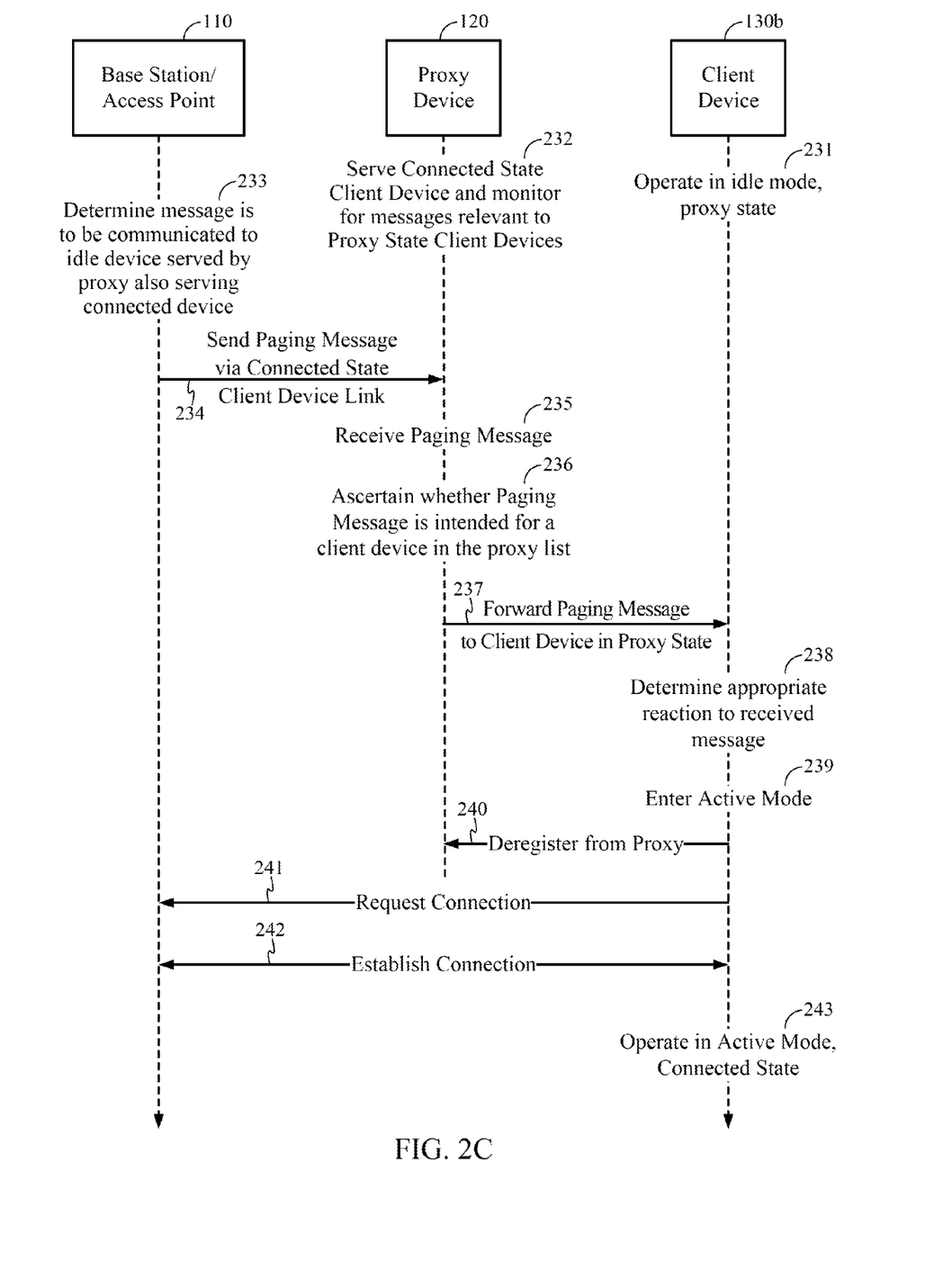
FIG. 2C shows a flow diagram of an exemplary operational flow for monitoring for paging or other messages while supporting an active connected mode proxied client device.

Directing attention to FIG. 2C, a flow diagram showing an exemplary operational flow for monitoring for paging or other messages while supporting an active connected mode proxied client device is shown. Upon entering the flow of FIG. 2C, client device 130a is assumed to be in an active mode, proxy connected state supported by proxy device 120 (e.g., the state reached at the conclusion of the flow diagram of FIG. 2B) and client device 130b is assumed to be in idle mode, proxy state operation supported by proxy device 120. Note that the operational flow of FIG. 2C is for the case where a first client device (here client device 130a, not shown in FIG. 2C) has entered a connected state, and proxy state operation continues to be provided for one or more other client device (here client device 130b). Thus, the client device for which idle mode, proxy state operation is provided is designated as client device 130b to be consistent with client device 130a having entered active mode, proxy connected state in the example of FIG. 2B. However, the designation of client device 130b is arbitrary for the example herein. It should be appreciated that idle mode, proxy state operation for client devices in addition to or in the alternative to client device 130b may be supported in accordance with the flow diagram of FIG. 2C.

In operation according to the illustrated embodiment, client device 130b operates in idle mode, proxy state at point 231. In this state, client device 130b may have temporarily deactivated (e.g., turned off or powered down) high power interface 131b of the client device to facilitate power conservation while low power interface 132b is periodically cycled (e.g., turned on or powered up) to periodically monitor for messages from proxy device 120.

In providing proxy state operation for client devices, proxy device 120 monitors for messages relevant to the client devices for which proxy state operation is provided at point 232. Because high power interface 121 of this example is utilized for supporting client device 130a in active mode, proxy connected state operation, proxy device 120 may be unable to fully or reliably monitor paging or other broadcast channels for messages directed to idle mode proxied client devices. For example, the active mode, proxy connected state operation may render proxy device 120 unable to reliably monitor a PCCH for paging type 1 messages. Accordingly, monitoring for paging or other messages by proxy device 120 may include monitoring channels in addition to or in the alternative to paging channels (e.g., PCCHs) of the idle mode, proxy state devices.

According to a new technique of the present disclosure for delivering paging messages for idle mode proxied client devices when another client device is operating in an active mode, connected state supported by a proxy device, UTRAN will initiate a procedure for an idle mode proxied client device by transmitting a paging message on the DCCH mapped to DCH or FACH for the active connected mode proxied client device (referred to herein as paging type 3 messages). A paging type 3 message may contain the client device identifier (e.g., IMSI, TMSI, ESN, MIN, IP address, telephone number, etc.), message type, paging cause, etc. Proxy device 120 may monitor such channels for messages relevant to other client devices for which proxy state operation is provided.

A device of communication network 150 (e.g., base station/access point 110) determines that a paging or other message is to be communicated to client device 130b. For example, it may be determined that a call is being placed to client device 130b. Thus, devices of communication network 150 may operate to determine an appropriate device (e.g., one or more particular base station/access point) and/or channel (e.g., one or more PCCH, DCCH, etc.) for transmitting the paging or other message, such as by determining a base station/access point (e.g., base station/access point 110) serving client device 130b and/or its designated proxy device (herein proxy device 120), determining a state of the client device and/or its designated proxy, etc. at point 233. For example, using information provided to communication network 150 by proxy device 120 regarding the client devices for which proxy services are being provided (e.g., at point 204 of FIG. 2A) and stored within proxy list 115 (FIG. 1B), a device of communication network 150 (e.g., a mobile switching center (MSC)) may recognize that idle mode proxied client device 130b for which a message is to be delivered is currently being provided proxy services by proxy device 120 and may further recognize that proxy device 120 is currently supporting client device 130a in an active mode, proxy connected state. Thus, it may be determined that communication of the paging or other message to client device 130b should be accomplished using a channel associated with client device 130a.

In operation according to the illustrated embodiment, an appropriate paging or other message for client device 130b is communicated from base station/access point 110 to proxy device 120, providing proxy connected state operation for client device 130a, in a DCCH established for client device 130a at point 234. That is, the illustrated embodiment may communicate the paging or other message for client device 130b to proxy device 120 using the aforementioned paging type 3 message. Irrespective of the particular technique utilized for delivery of the paging or other message, proxy device 120 receives the paging or other message (e.g., using high power interface 121) at point 235.

According to the illustrated embodiment, proxy device 120 operates to ascertain whether the received paging or other message is intended for a client device served by the proxy device at point 236. For example, proxy device 120 may analyze received messages to determine the relevance of such messages to the client devices for which proxy state operation is being provided. Such analysis may include comparing client device information (e.g., IMSI, TMSI, ESN, MIN, IP address, telephone number, and/or the like) to information stored in proxy list 125.

Assuming proxy device 120 concludes that the paging or other message is intended for client device 130b, proxy device 120 forwards the paging or other message (or portion thereof) to client device 130b at point 237. For example, client device 130b may operate to periodically cycle (e.g., turn on or power up) low power interface 132b to periodically monitor for messages from proxy device 120 and, during such a cycle, proxy device 120 may communicate the paging or other message (or portion thereof) to client device 130b, such as via low power interface 122 and low power interface 132b.

Having received a paging or other message, client device 130b of the illustrated embodiment operates to determine the appropriate reaction to the received message at point 238. The message may, for example, provide information to client device 130b or otherwise not require or facilitate a change of operating mode or state of client device 130b, thereby resulting in client device 130b remaining in the idle mode, proxy state after receiving the message. However, the message may result in a change of operating mode or state of client device 130b, such as to establish an active call or other connection with communication network 150.

Assuming that an appropriate reaction to the message provided to client device 130b is to enter an active mode, connected state, client device 130b of the illustrated embodiment enters active mode at point 239. For example, a processor of client device 130b may become more or fully active, one or more interface (e.g., low power interface 132b) may be turned on (e.g., the cycling of the idle mode, proxy state operation discontinued), etc.

Consistent with the determination that the client device is to enter a connected state, client device 130b of the illustrated embodiment communicates a request to deregister from proxy device 120 at point 240. For example, having determined that the appropriate reaction to the received message is to enter an active mode, connected state, client device 130b of embodiments further determines the state of proxy device 120 (e.g., by using information provided to client device 130b by proxy device 120, monitoring operation of proxy device 120, querying proxy device 120, etc.). Client device 130b may thus determine that active mode, proxy connected state operation is not presently available for client device 130b with respect to proxy device 120. Accordingly, client device 130b may request to deregister from proxy device 120 in order to pursue a network connection in response to the received message. Correspondingly, client device 130b of the illustrated embodiment requests that an appropriate connection with communication network 150 be established at point 241. In response, an appropriate network connection (e.g., using high power interface 131*b* to base station/access point 110) is established at point 242. It should be appreciated that the request for a connection with communication network 150 and/or establishing the connection with communication network 150 may be performed before, simultaneously with, or after deregistering from proxy device 120. Using the foregoing connection, client device 130*b* is provided communications with communication network 150, and thus may operate in an active mode, connected state in accordance with the received paging or other message at point 243.

Although the illustrated embodiment shows client device 130*b* deregistering from proxy device 120, it should be appreciated that proxy devices of embodiments may serve a plurality of client devices in active mode, proxy connected state operation. Where the proxy device can support more than one client device in active mode, proxy connected state operation, the aforementioned client device need not deregister from the proxy device. Accordingly, a client device of embodiments may be operating in an active mode, proxy connected state along with another active connected mode proxied client device according to embodiments of the invention. However, a subsequent client device which is transitioning from idle mode, proxy state operation to active mode, proxy connected state operation being served by proxy device 120 which is already serving a maximum number of client devices in active mode, proxy connected state operation may deregister as described above.

In accordance with the foregoing, once an idle mode proxied client device gets a paging or other message, when the proxy device is supporting proxy connected state operation for another client device, the proxy device will wake up the idle mode proxied client device and that client device will be on its own to connect with the network (e.g., the second client device will not be connected through the proxy device due to the first client device already being connected through the proxy device) while the active connected mode proxied client device continues to be serviced by the proxy device. For example, once the proxy device receives a relevant paging type 3 message, the proxy devices operates to wake up the concerned idle mode proxied client device (e.g., over a BLUETOOTH link between the proxy device and client device) and delivers the page or other information. The foregoing technique may be implemented with respect to client devices operating in slotted sleep mode without waking up to monitor the pages to provide significant power consumption savings for many implementations (e.g., CDMA2000 implementations and W-CDMA implementations). If, however, the client devices are in deep sleep mode for even more power savings, for example, the foregoing technique may be altered to wake up the appropriate client device and the communication network may retransmit the page.

According to embodiments, a proxy device RRC forwards the paging cause, core network (CN) domain identity, and client device identity type to the corresponding client device, and the client device RRC will forward the same to client device non-access stratum (NAS). The client device NAS may then proceed to start a RRC connection request whereby the client device will start exchanging signaling messages with the communication network. The client device may deregister with the proxy device and be on its own. The proxy device may then inform the communication network about the client device no longer being in proxy mode. After the call terminates, the client device may reregister with the proxy device (e.g., in accordance with the flow diagram of FIG. 2A).

It should be appreciated from the foregoing that embodiments utilize assistance from the communication network in implementing the foregoing paging or other message delivery. For example, the communication network may be aware of the client devices that are being served by a proxy device. If all the client devices are in an idle mode, the proxy device may monitor the paging indicators for each individual client device. However, when one client device is provided active mode, proxy connected state operation by the proxy device, the communication network may stop sending the paging indicators for other client devices served by the proxy device. Instead the communication network may communicate the page for a client device served by the proxy device using a control channel (e.g., the dedicated RRC connection) of the proxy device that is in connected state (CELL_DCH or CELL_FACH) for the active connected mode proxied client device. This technique not only facilitates continued proxy support of idle mode client devices by a proxy device providing connected state operation with respect to a client device, but also helps to reduce the paging load on the network. Moreover, the use of paging type 3 messages according to embodiments herein reduces call set up latency for idle mode proxied client devices (e.g., the use of paging type 3 messages eliminate scheduling delay for idle mode proxied client devices, which on average is approximately half of the slot cycle/DRX cycle).

Although the present teachings and their advantages have been described in detail, it should be understood that various changes, substitutions and alterations can be made herein without departing from the technology of the teachings as defined by the appended claims. Moreover, the scope of the present application is not intended to be limited to the particular aspects of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding aspects described herein may be utilized according to the present teachings. Accordingly, the appended claims are intended to include within their scope such processes, machines, manufacture, compositions of matter, means, methods, or steps.

What is claimed is:

1. A method to provide message delivery to an idle device by a proxy device serving a connected device, the method comprising:
 establishing a first communication link between the proxy device and a network device for a communication session of the connected device, the first communication link including a control channel;
 monitoring the control channel by the proxy device for information directed to the idle device; and
 communicating, by the proxy device while serving the connected device via the first communication link, at least a portion of the information to the idle device via a second communication link.

2. The method of claim 1, wherein the control channel comprises a dedicated control channel associated with the connected device.

3. The method of claim 2, wherein the communicating at least a portion of the information comprises:
 forwarding the information by a radio resource control of the proxy device to a radio resource control of the idle device.

4. The method of claim 1, wherein the first communication link comprises a high power communication link and the second communication link comprises a low power communication link.

5. The method of claim 1, wherein the first communication link comprises a cellular network wireless communication link, and wherein the second communication link comprises a personal area network wireless communication link.

6. The method of claim 1, further comprising:
the idle device entering an active state, deregistering with the proxy device, and establishing a communication link between the now active device and the network device in response to the communicating at least a portion of the information to the idle device.

7. The method of claim 1, wherein the information comprises a paging message.

8. A system for providing message delivery to an idle device by a proxy device serving a connected device, the system comprising:
a first transmitter that establishes a first communication link between the proxy device and a network device for a communication session of the connected device;
a receiver that monitors at least one channel of the first communication link by the proxy device for information directed to the idle device;
a second transmitter that establishes a second communication link between the proxy device and the idle device for information communication with the idle device; and
a communication system that communicates at least a portion of the information to the idle device by the proxy device via the second communication link while serving the connected device via the first communication link.

9. The system of claim 8, wherein the at least one channel of the first communication link comprises a control channel associated with the connected device.

10. The system of claim 8, wherein the first communication link comprises a high power communication link and the second communication link comprises a low power communication link.

11. The system of claim 10, wherein the high power communication link comprises a link selected from the group consisting of a wideband code division multiple access (W-CDMA) link, a CDMA2000 link, a global system for mobile (GSM) link, and a worldwide interoperability for microwave access (WiMax) link, and the low power communication link comprises a link selected from the group consisting of a BLUETOOTH link and an ultra-wideband (UWB) link.

12. The system of claim 8, wherein the first communication link comprises a cellular network wireless communication link, and wherein the second communication link comprises a personal area network wireless communication link.

13. The system of claim 8, wherein the information comprises a paging message.

14. A computer program product operable to provide message delivery to an idle device by a proxy device serving a connected device, the program product comprising:
a non-transitory computer readable medium storing computer executable code, the computer executable code including:
code to establish a first communication link between the proxy device and a network device for a communication session of the connected device, the first communication link including a control channel;
code to monitor the control channel for information directed to the idle device;
code to establish a second communication link between the proxy device and the idle device for information communication with the idle device; and
code to communicate at least a portion of the information to the idle device via the second communication link from the proxy device while serving the connected device via the first communication link.

15. The computer program product of claim 14, wherein the first communication link comprises a high power communication link and the second communication link comprises a low power communication link.

16. The computer program product of claim 14, wherein the first communication link comprises a cellular network wireless communication link, and wherein the second communication link comprises a personal area network wireless communication link.

17. The computer program product of claim 14, wherein the information comprises a paging message.

18. The computer program product of claim 14, wherein the code to establish a first communication link, the code to monitor the control channel, the code to establish a second communication link, and the code to communicate at least a portion of the information is operable upon processor circuitry of the proxy device.

19. A method to provide page delivery to an idle device for which idle mode proxy operation is supported by a proxy device which is also serving a connected device, the method comprising:
determining that a message is to be communicated to an idle device for which idle mode proxy operation is currently provided by the proxy device;
determining if the proxy device serving the idle device is also currently serving a connected device; and
communicating the message to the proxy device for idle mode message delivery to the idle device using a control channel of a communication session of the connected device if it is determined that the proxy device is currently serving a connected device.

20. The method of claim 19, further comprising:
communicating the message to the proxy device for idle mode message delivery to the idle device using a paging channel of the idle device if it is determined the proxy device is not currently serving a connected device.

21. The method of claim 19, wherein the message comprises a paging message.

22. A system for providing message delivery to an idle device by a proxy device serving a connected device, the system comprising:
means for establishing a first communication link between the proxy device and a network device for a communication session of the connected device;
means for monitoring at least one channel of the first communication link by the proxy device for information directed to the idle device;
means for establishing a second communication link between the proxy device and the idle device for information communication with the idle device; and
means for communicating, by the proxy device while serving the connected device via the first communication link, at least a portion of the information to the idle device via the second communication link.

* * * * *